United States Patent [19]

Enomoto

[11] Patent Number: 4,848,884
[45] Date of Patent: Jul. 18, 1989

[54] VARIABLE FOCUSING LENS BARREL

[75] Inventor: Keiji Enomoto, Tokyo, Japan

[73] Assignee: Ricoh Company, Ltd., Tokyo, Japan

[21] Appl. No.: 152,102

[22] Filed: Feb. 4, 1988

[30] Foreign Application Priority Data

Feb. 5, 1987 [JP] Japan .............................. 62-14858[U]
Feb. 20, 1987 [JP] Japan .............................. 62-22685[U]

[51] Int. Cl.$^4$ ......................... G02B 7/10; G02B 15/00
[52] U.S. Cl. ................................... 350/429; 350/430; 354/400
[58] Field of Search ....................... 350/429, 430, 255; 354/400, 402, 403, 195.1, 430

[56] References Cited

U.S. PATENT DOCUMENTS 4,083,057  4/1978  Quinn .................................. 350/429
4,421,389 12/1983  Muryoi ................................ 350/429

*Primary Examiner*—Bruce Y. Arnold
*Assistant Examiner*—Loha Ben
*Attorney, Agent, or Firm*—Oblon, Spivak, McClelland, Maier & Neustadt

[57] ABSTRACT

A variable focus lens barrel in which a variable power drive frame has a plurality of cam grooves which each receive a cam pin provided on each of movable frames to which a lens group is each fixed, the variable power drive frame being driven by a motor to perform variable power drive, wherein a balanced groove is formed at each of both ends of a variable power drive range of each of the cam grooves formed in the variable power drive frame such that the balanced groove extends circumferentially of the variable power drive frame over a predetermined angular range from each end, and wherein each of the movable frames does not move in the direction of the optical axis in a rotational area of the variable power drive frame in which each of cam pins slides in the corresponding balanced groove.

4 Claims, 7 Drawing Sheets

VARIABLE FOCUSING LENS BARREL

This invention relates to a variable focusing lens barrel and more particularly to such barrel in which the movement of a variable power optical system along the optical axis between a shorter focal-distance end and a longer focal-distance end is performed by the torque-from a variable power motor and the focusing drive is also performed by the torque from a focusing drive motor.

Generally, when a plurality of lens groups constituting a zoom or a variable power optical system in a zoom lens barrel or a variable focusing lens barrel is individually driven selectively to perform a zoom or a variable power drive, a zoom or a variable power drive frame which rotates around the optical axis or directly moves along the optical axis is provided and driven manually.

Recently, exposure, film feed, automatic focusing, etc., in a camera have electrically been performed automatically and the entire size of camera is greatly miniaturized. The present situation is that a type in which zoom or variable power drive is performed by applying the torque of a motor to the zoom or variable power drive frame also in the zoom lens barrel or variable focus lens barrel is employed and realized as a product.

In that case, each of cam grooves provided to zoom drive a plurality of lens groups is formed such that it stops not only the zoom drive of a plurality of lens groups, but also the drive of the zoom drive frame in each of the shorter and longer focus side end areas of the zoom drive range. Therefore, there is the problem that when the zoom drive frame is driven by motor, the cam pin is strongly pushed against the end surface of the cam groove at the shorter and longer focus side ends of the zoom drive range, so that an overload acts on the motor.

Especially, if a continuous cam groove is formed at the shorter focus side end of the zoom drive range for retraction of the lens barrel or a continuous cam groove is formed for macrodriving at the longer focus side end, the position accuracy of boundary portion (the accuracy with which an area where the zoom lens is located is ensured) is reduced to render mode switching uncertain.

The position of such variable focusing lens once focused by changing the focal distance is likely to change compared to the zoom lens, so that it is necessary to perform a refocusing operation each time the focal distance is changed. However, it has the advantage that the entire lens optical system is miniaturized, so that it is often employed in a camera.

In that case, the variable power drive frame provided for variable power drive of a plurality of lens groups is composed of at least one first and one second drive frame which are rotated integrally to move movable frames to which the corresponding lenses are individually fixed in the direction of the optical axis for variable power drive. In addition, a plurality of lens groups engaged in the second drive frame alone are driven for focusing by driving the second drive frame alone in the direction of the optical axis.

The drive range of the second drive frame for focus drive is constant irrespective of where the focal distance in the variable power drive range is. Such drive range is set so as to have a range from the position of a maximum possible value, namely, infinity in the longest-focal distance side to a value corresponding to a predetermined nearest distance.

A second drive frame driving range necessary for focus driving in the range from the position of infinity to a value corresponding to the predetermined nearest distance decreases as the focal distance decreases, of course.

Therefore, the driven range set for the longest focal distance is focus driven to a further nearer position than the predetermined nearest position when the second drive frame is driven to the shorter focal distance side for variable power purposes.

Thus, when the second drive frame is driven to the shorter focal distance side for variable power drive, it is focus driven to a near distance which does not satisfy the optical characteristic.

Therefore, it is required to take some measures to prevent the focus driving to a near distance which does not satisfy the optical characteristic.

In order to attain an automatically focused state in the variable focusing lens, it is possible to dispose a focusing sensor at a osition conjugate to the film surface to measure the distance normally on the basis of the output from the focusing sensor during variable power driving, and to drive the focusing lens by a focusing drive motor to achieve a focused state normally. However, it is impossible to sense a stop signal for the focusing drive motor at the nearest distance from the output of the focusing sensor. Therefore, it is required to take some measures also in that case to thereby prevent the focus driving to a near distance which does not satisfy the optical characteristic.

This invention derives from the contemplation of the above situation. The object of this invention is to provide a variable focus lens barrel which when driven to each of the shorter and longer focal point side end areas of the variable power drive range for the variable focus lens barrel, exerts no overload on the motor and which is capable of realizing improvements to the accuracy of lens position at the respective end areas, namely, the focal-distance accuracyat the espective end areas without using an especial complicated structure.

Another object of this invention is to provide a variable focusing lens barrel which prevents the focusing drive to a near distance which does not satisfy the optical characteristic.

The first object of this invention is achieved by a variable focus lens barrel in which a variable power drive frame has a plurality of cam grooves which each receive a can pin provided on each of movable frames to which a lens group is each fixed, said variable power drive frame being driven by a motor to perform variable power drive, wherein a balanced groove is formed at each of both ends of a variable power drive range of each of the cam grooves formed in the variable power drive frame such that the balanced groove extends circumferentially of the variable power drive frame over a predetermined angular range from each of said both ends, and wherein each of movable frames does not move in the direction of the optical axis in the rotational area of the variable power drive frame in which each of cam pins slides in the corresponding balanced groove.

The other object of this invention is achieved by a variable focus lens barrel in which a plurality of movable framesto which a lens group is each fixed are disposed slidable in the direction of the optical axis relative to a fixed lens barrel, a plurality of variable power drive frames each have cam grooves each receiving the corresponding cam pin provided on each of said movable frames and are rotatable relative to the fixed barrel, the variable power drive frames are rotated as a unit by a variable power drive motor to perform variable power drive of the plurality of lens groups, only a predetermined one of variable power drive frames is driven by a focusing drive motor to drive only the lens group engaged in the predetermined variable power drive frame in the direction of the optical axis to thereby perform a focusing drive, characterized by a stop pin fixed to said fixed barrel and a near-distance stop cam provided on the predetermined variable power drive frame such that said stop cam abuts on the stop pin at a position corresponding to the nearest-distance during variable-power driving.

According to this invention, when the variable power frame is driven to each of the shorter and longer focus side end areas of a variable power drive range in the variable focus lens barrel, no overload acts on the drive motor, the accuracy of lens position in each end area, and hence the accuracy of focal distance in each end area are improved only by modifying a cam shape without using any special complicated structure.

In an embodiment, barrier vanes can be closed at the end of the retracted barrel area, it is possible to pevent deposition of dust, finger prints, etc., on the lens surface and/or damage to the lens when the camera is in a non-photographing state. Provision of the lens barrier is optional.

Since information corresponding to the position of the driven lens is extracted depending on the position where the variable power pattern base plate and a contact piece contact, each drive control, namely, variable power, macro, accommodation drive and control can be performed.

In addition, since information on the photographing distance is extracted depending on the position where the focus pattern base plate and the contact piece contact, focus drive and control is upgraded.

According to this invention, furthermore, the advantages of a variable focus lens that the lens system is miniaturized, lightened and manufactured inexpensively are utilized, while a deviation of the focusing position specific to the variable focus lens at the time of variable power and fluctuations (indefiniteness) of the position where the near distance stopping is performed and occurring at the variable power position (changes in the focal distance) are eliminated surely.

More particularly, a deviation of the focusing position when the power is varied can be eliminated adjustably by driving the focus drive motor on the basis of the output from an automatic focusing sensing circuit during or after the variable power.

The positional restriction at the nearest-distance position occurring at the variable power position is achieved by forming, at the front end of the variable power drive frame, a near-distance stop cam surface corresponding to a quantity of extrusion of the lens corresponding to the focal distance and variable power drive angle, and fixing a stop pin to the fixed barrel so that the stop pin abuts on the near-distance stop cam surface at a predetermined position. Thus, even if the lens is at the nearest-distance position which satisfies the optical performance during telephoto photographing, the lens is prevented from being focused at the near-distance position which does not satisfy the optical performance during wide-angle photographing.

Therefore, a deviation of an imaging position caused by the focusing operation and constituting a difficulty specific to the variable focus lens is automatically eliminated adjustably by the focusing drive motor. The near-distance stop positions at the respective focal distances vary, which is another difficulty; for example, the focus adjustment of the lens at a near-distance position which does not satisfy the optical performance in wide-angle photographing even if the lens is at a near-distance position satisfying the optical performance in telephoto photographing, is avoided by performing a positional restriction of the predetermined variable power drive frame by a near-distance stop provided on the predetermined variable power frame and a stop pin provided on the fixed barrel. Therefore, even if the photographing lens is in any focal distance, it is beforehand prevented from being used outside the near-distance limit where the optical performance is deteriorated.

Embodiments of this invention will now be described in detail with reference to FIGS. 1–8 of the accompanying drawings. Thus, these features, objects, and other objects and features of this invention will be clarified. This invention is not limited to embodiments thereof disclosed hereinafter, and could be modified in various forms without departing from the scope of this invention.

Figure 1:
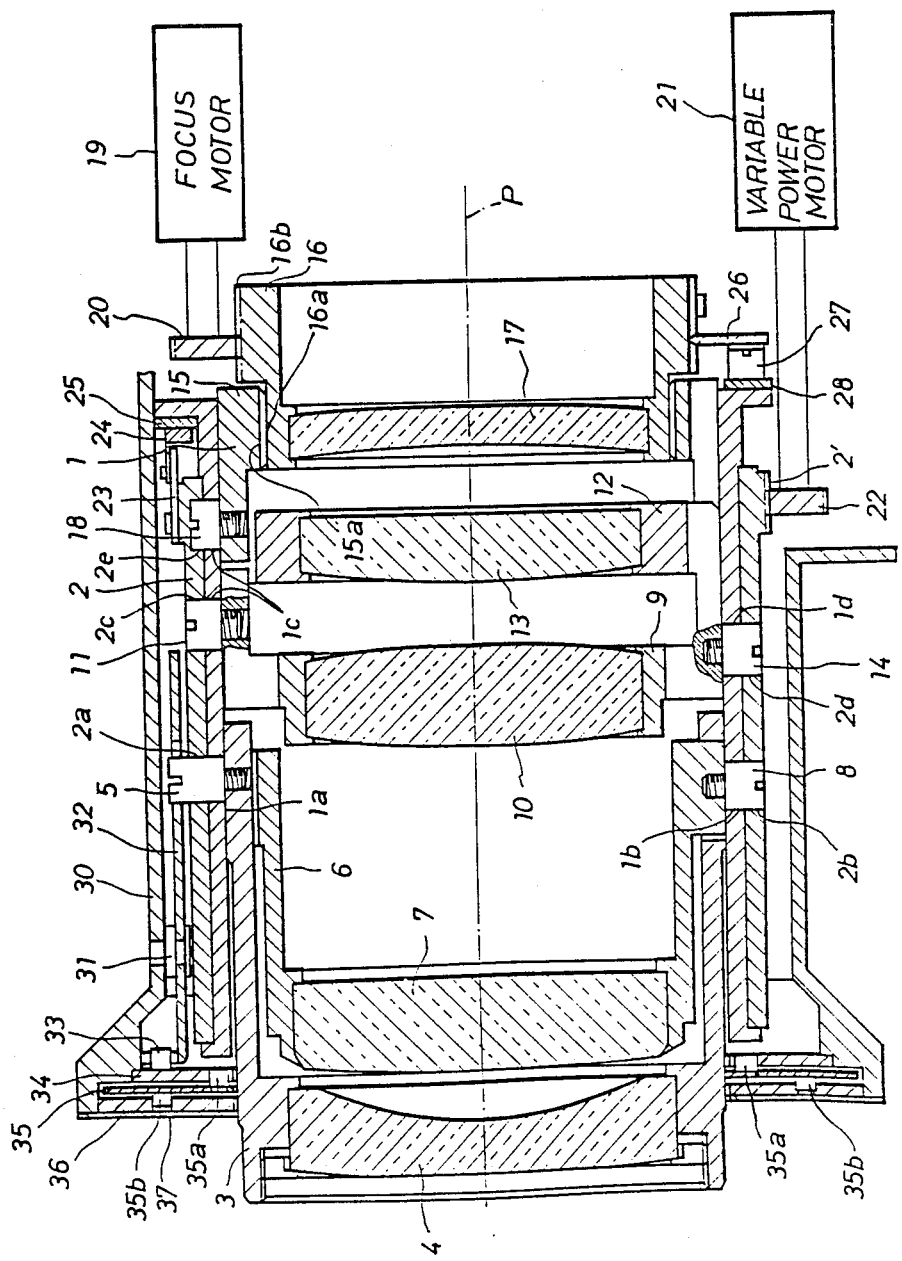
FIG. 1 is a schematic cross-section view showing the structure of an embodiment of a variable focusing lens barrel according to this invention.
Figure 2:
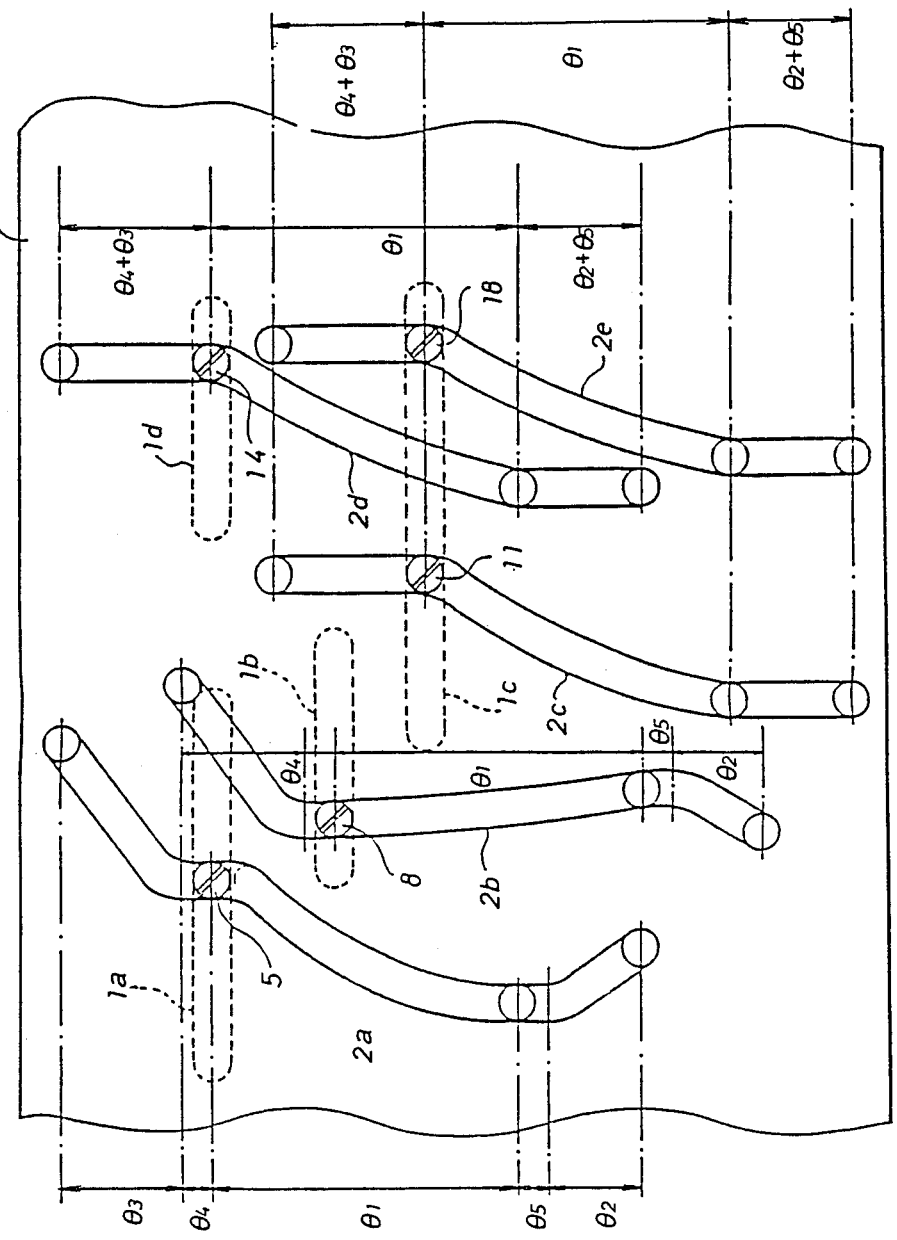
FIG. 2 is an exploded view of a cam showing the relationship among cam grooves, direct travel grooves and cam pins shown in FIG. 1.

FIG. 1 is a schematic cross-section view of a variable focus lens barrel showing a specific example of this invention. It shows an embodiment in which this invention is applied to a camera in which a variable focus lens barrel of the type in which a lens is driven electrically in three areas; a macro area, a variable power area and an accommodating area is fixed to the camera body, namely, a so-called multifocus compact camera.

The specific example also shows that the variable power optical system is composed of five lens groups which are moved in a complex manner for variable power drive and that the rearmost lens group is moved for focus driving, namely, that the photographing lens is constituted by a so-called rear focus variable power lens.

In FIGS. 1–5, a fixed cylindrical frame 1 is fixed integrally with the camera body (not shown). Provided around the outer periphery of the fixed frame is a variable power drive frame 2 which is prevented from moving along the optical axis P, but supported slidable circumferentially.

Disposed within the frame 1 is a first cylindrical movable frame 3 such that it is slidable at its rear peripheral portion. A first group lens 4 is fixed at the front end of the frame 3. A first outwardly protruding cam pin 5 is fixedly screwed into the rear end of the first movable frame 3. As shown in the exploded cam view of FIG. 2, the first cam pin 5 fits into a direct travel groove 1a provided in the frame 1 so as to be parallel to optical axis P and also into a first cam groove 2a provided in the drive frame 2 so as to traverse the optical axis P. The first cam groove 2a includes at its intermediate area a variable power curved portion corresponding to a variable power drive area (range) angle $\theta_1$ and a balanced area angle $\theta_4$ formed so as to be orthogonal to the optical axis P so that the first cam pin 5 does not move in the direction of the optical axis P, the angle $\theta_4$ continuing to the shorter-focus side end of the curved portion. A balanced area angle $\theta_5$ similar to the balanced area angle $\theta_4$ is formed such that it continues to the end of the longer focal distance side of the angle $\theta_1$. In addition, a macro area angle $\theta_2$ and an accommodating area angle $\theta_3$ are formed so as to be continuous to the corresponding ends of the balanced area angles $\theta_5$ and $\theta_4$, respectively.

Slidably provided within the fixed frame 1 is a second divided-type movable frame 6 which does not interfere with the first movable frame 3. A second group lens 7 is fixed to the second movable frame 6 and a second cam pin 8 fixed to the periphery of the frame 6.

The second cam pin 8 is arranged to be moved in the direction of variable power by means of a direct travel groove 1b and a second cam groove 2b similar to the corresponding ones mentioned above. The second cam groove 2b also has angles $\theta_1$–$\theta_5$ similar to the corresponding ones mentioned above.

Slidably provided within the fixed frame 1 is a third movable frame 9 to which a third group lens 10 is fixed. A third cam pin 11 is fixed to the periphery of the frame 9. The third cam pin 11 is adapted to be moved in the direction of variable power by means of a direct travel groove 1c and a third cam groove 2c similar to the corresponding ones mentioned above. The third cam groove 2c includes in its intermediate area an angle $\theta_1$ corresponding to the variable power driving range, a balanced ara formed at the shorter-focal distance end of the angle $\theta_1$ so as to be orthogonal to the optical axis P so that the third cam pin 11 does not move in the direction of the optical axis P, and another balanced area similar to the above-mentioned balanced area formed at the longer-focal distance end of the angle $\theta_1$.

Slidably provided within the fixed frame 1 is a fourth movable frame 12 to which a fourth group lens 13 is fixed, and a fourth cam pin 14 is fixed to the periphery of the fourth movable frame 12. The fourth cam pin 14 is arranged to move in the direction of variable power by means of a direct travel groove 1d and a fourth cam groove 2d similar to the corresponding ones mentioned above. The fourth cam groove 2d includes at its intermediate area an angle $\theta_1$ corresponding to the variable power driving range and similar to the shape of the third cam groove mentioned above, a balanced area formed at the shorter focal distance end of the angle $\theta_1$ so as to be orthogonal to the optical axis P so that the fourth cam pin 14 does not move in the direction of the optical axis P, and another balanced area similar to the above-mentioned balanced area formed at the longer-focal distance end of the angle $\theta_1$.

Slidably provided within the fixed frame 1 is a fifth divided-type movable frame 15 which does not interfere with the fourth frame 12. The fifth frame 15 has in its inner periphery an internal thread 15a into which an external thread 16a formed around a small-diameter step in the stepped focus drive frame 16 is screwed. Teeth 16b of a spur gear are formed at the larger-diameter step of the focus drive frame 16. A fifth groiup lens 17 is fixed to the fifth movable frame 15 with a fifth cam pin 18 being fixed to the periphery of the frame 15.

The fifth cam pin 18 includes is arranged to move in the variable power direction by means of an extension of the direct travel 1c in which the third cam pin 11 is engaged and not interfering with the third cam pin 11, and a fifth cam groove 2e. The fifth cam groove 2e has in its intermediwte area an angle $\theta_1$ corresponding to the variable power drive rage as in the third cam groove 2c and balanced areas, one at each of the shorter and longer focal-distance ends of $\theta_1$, each balanced area being similar to the third cam groove 2c.

The gear teeth 16b of the focus drive frame 16 mesh with an output gear wheel 20 formed at an end of the cylindrical focus drive motor 19 such that by rotation of the motor 19 the position of the focus drive frame 16 relative to the fifth movable frame 15, namely, the position of the fifth group lens 17 relative to the fixed frame 1 and along the optical axis P is changed. Such change is arranged to cover a predetermined focus drive area when the frame 16 rotates through a certain angular area smaller than its complete rotation.

Formed around the rear periphery of the variable power drive frame 2 are gear teeth 2' which mesh with an output gear wheel 22 formed at an end of a cylindrical variable power drive motor 21 such that by rotation of motor 21, the frame 2 is rotated around the optical axis P. When the drive frame 2 is rotated through a predetermined angular range smaller than one complete rotation, all the areas for the predetermined variable power driving, barrel retraction, macrodriving and balanced states are covered.

On the other hand, fixed at a rear periphery of the frame 2 is a contact piece fixing plate 23 which supports one end of a contact piece 24. The other end of the contact piece 24 electrically contacts a variable power pattern base plate 25 fixed to the inner periphery of the rear large-diameter portion of the fixed frame 1. Thus an electrical signal corresponding to the angle of the frame 2 driven (for variable power) relative to the fixed frame 1 is obtained, for example, from the contact piece 24.

Also, supported around the outer periphery of the focus drive frame 16 is a contact piece fixing plate 26 which supports at its end a contact piece 27 movable in the direction of the optical axis P. The contact piece 27 is at its end in electrical contact with a focus pattern base plate 28 fixed to the outer periphery of the rear large-diameter portion of the fixed frame 1. Thus an electrical signal corresponding to the rotational angle of the focus drive frame 16 driven for focusing relative to the fixed frame 1 is obtained, for example, from the contact piece 27.

Similarly to the fixed frame 1, an outer housing 30 is provided integrally with the camera body and has a funnel-like open front end portion. An inwardly protruding support member 31 protruding at the front end of the intermediate portion of the housing 30 is fixed by caulking, so that barrier drive lever 32 is rotatably supported by the member 31.

Figure 4:
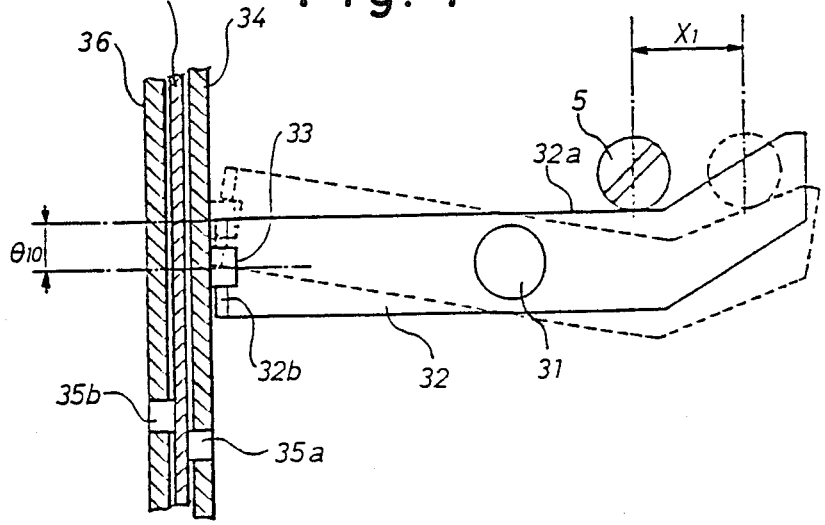
FIG. 4 is an enlarged view showing the details of a barrier driving lever shown in FIG. 1.

As shown in more detail in FIG. 4, the lever 32 is adapted to abut on or against the first cam pin 5 at a driven edge 32a formed on the side of one arm thereof, so that when the canm pin 5 is driven as the variable power frame 2 moves and corresponds to the barrel retraction range of the driven range $x_1$, the barrier drive lever 32 is turned clockwise.

A ring-like barrier drive disc 34 to which a barrier drive pin 33 protruding backwardly is fixed is rotatably supported around the optical axis P within the front opening in the housing 30. The disc 34 has two slots in which correspoonding pins 35a are rotatably inserted, the pins 35a being fixed to barrier vanes 35 and protruding backwardly from a pair of semi-circular barrier vanes 35 which form one disc when the vanes abut at their chords. Provided at the front surface of the vanes 35 are forwardly protruding pins 35b which are inserted rotatably into axial holes provided in a disc-like fixed plate 36. A front cover 37 is fixed before the fixed plate 36. The barrier drive pin 33 is engaged in the drive fork portion 32b of the lever 32.

When the pin 33 is driven by the lever 32, the pair of barrier vanes 35 are opened and closed.

The variable focus lens barrel of the embodiment constructed as described above operates as follows.

Assume that focusing is performed in a state in which the variable power drive frame 2 is driven such that a desired focal distance is attained by the drive motor 21. When the focus drive motor 19 is rotated on the basis of the output from the automatic focus sensing circuit (not shown) provided in the camera body, the focus drive frame 16 is rotated via the output gear wheel 20 and the external thread portion 16 is subjected to the screwing action of the internal thread 15a of the fifth movable frame 15, so that the focus drive frame 16 moves in the direction of the optical axis depending on the direction of rotation thereof. At that time, the movement of the fifth movable frame 15 in its rotative direction is restricted by the fifth pin 18 engaged in the direct travel groove 1c, so that only the focus drive frame 16 moves in the direction of the optical axis together with the fifth group lens 17 to thereby achieve a desired focused state.

At the time, the position of the contact piece 27 in electrical contact with the focus pattern base plate 28 changes and the information on the focus pattern base plate 28 (the information on the focus position) is fed back to a control circuit (not shown) provided on the side of the camera body, so that the drive of the focus drive motor 19 is controlled appropriately in forward and reverse directions until the focused state is obtained.

Figure 3:
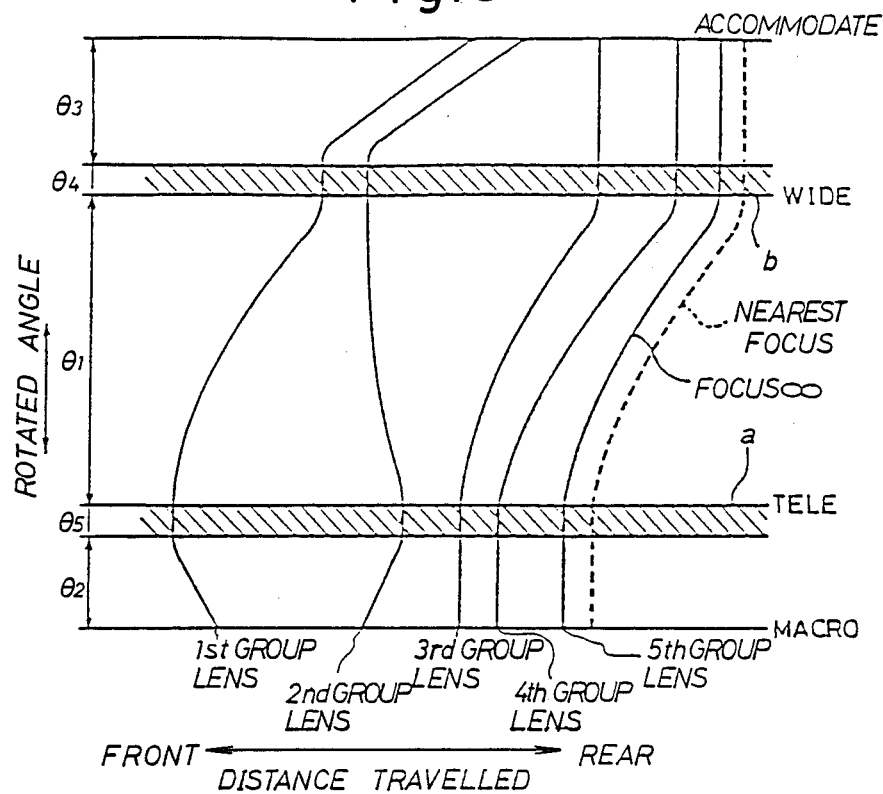
FIG. 3 is a schematic view showing the relationship between the rotational angle of the variable power drive frame and quantity of movement of the respective lens groups.

When the variable power drive motor 21 is powered by pressing a variable power button (not shown) in order to drive the power, the torque of motor 21 is transmitted via the output gear wheel 22 to the teeth 2' to thereby rotate the drive frame 2. This causes the first-fifth cam pins 5, 8, 11, 14 and 18 to move in the direction of the optical axis P in accordance with the respective shapes, of the first-fifth cam grooves 2a-2e in the state in which they are restricted from rotating around the optical axis P by the respective direct travel grooves 1a, 1b, 1c and 1d. As shown in FIG. 3, the first-fifth group lenses 4, 7, 10, 13 and 17 are moved by predetermined respective distances in the directionof the optical axis P to establish a variable focus photographing lens optical system. The range of such variable power drive is within the range of angle $\theta_1$. By the rotation of the variable power drive frame 2, the position of contact piece 24 in electrical contact with the variable power pattern base plate 25 is changed, so that information on the current focal distance is sensed. This information is fed back to the control circuit provided in the camera body and processed in an appropriate manner.

When the variable power drive motor 21 is powered in order to drive the lens to the variable power drive end, the drive frame 2 is rotated due to a delay in the stopping of the motor 21, etc., from the end of the angle $\theta_1$ into the angle $\theta_4$ in the balanced area or into the angle $\theta_5$ (the cam pins 5, 8, 11, 14 and 18 slide on the balanced grooves provided over the angles $\theta_4$, $\theta_5$). Namely, the variable power drive frame 2 rotates in the state in which the movement of the first-fifth cam pins 5, 8, 11, 14 and 18 in the direction of the optical axis P is restricted (stopped), so that the first-fifth group lenses 4, 7, 10, 13 and 17 do not move in the direction of optical axis P and the focal distance corresponding to the end of the variable power range is maintained accurately even if the first-fifth lenses enter the balanced areas.

On the other hand, when the variable power drive motor 21 is powered in order to perform mwacrophotographing, the first and second cam pins 5 and 8 pass through the balanced area for angle $\theta_5$ from the longer focus end of the angle $\theta_1$ variable power area in a manner similar to that mentioned above and move in the direction of the optical axis P by quantities determined by the first and second cam grooves 2a and 2b in the macroarea, so that the first movable frames 3 (first group lens 4) and the second movable frame 6 (second group lens 7) each move also in the direction of the optical axis P. At that time, the third-fifth group lenses 10, 13 and 17 do not move in the direction of the optical axis P because the shape of the third-fifth cam grooves 2c, 2d and 2e are orthogonal to the optical axis P.

In the above various cases, the first cam pin 5 does not abut on the driven portion 32a of the barrier drive lever 32, so that the barrier drive lever 32 does not change in position and the barrier vanes 35 are open.

When the drive motor 21 is powered in a nonphotographing state in order to retract the first and second movable frames 3 and 6, the variable power drive frame 2 rotates. Thus, similarly, the first and the second cam pins 5 and 8 move from the shorter-focus end of the variable power area for the angle $\theta_1$ to the balanced area for the angle $\theta_4$ (the area where the balanced groove is formed) and restricted by the first and the second cam groove 2a and 2b in the accommodating area to thereby move in the direction of the optical axis P. At that time, the third-fifth group lenses 10, 13, 17 do not move in the direction of the optical axis P because the shape of the third-fifth cam grooves 2c, 2d and 2e are orthogonal to the optical axis P.

Figure 5:
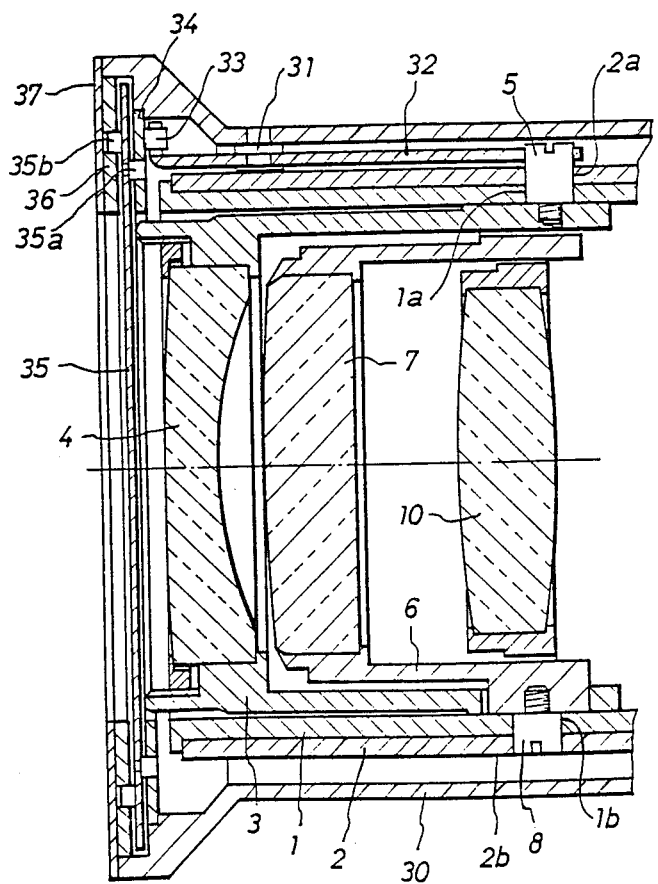
FIG. 5 is a cross-section view showing the retracted lens barrel in the specific example.

When the motor 21 continues to rotate in the same direction as before, and the first and second cam pins 5 and 8 arrive at the end of the accommodating area for angle $\theta_3$ while being subjected to the restriction of the first and second cam grooves 2a and 2b, both lenses 4 and 7 (first and second movable frames 3 and 6) are accommodated into the lens barrel (outer housing 30), as shown in FIG. 5.

In cooperation with such accommodating operation, the first cam pin 5 pushes the driven portion 32a of the barrier drive lever 32 to move the barrier drive pin 33 by the fork portion 32b, so that the barrier drive plate 34 is rotated around the optical axis P. This causes the pin 35a of the barrier vane 35 which has the other pin 35b supported in the axial hole in the fixed plate 36 to rotate by means of the slot formed in the drive plate 34, so that the pair of barrier vanes 35 is closed.

When variable power photographing is started in such retracted condition, the variable power drive motor 21 is powered such that the drive reverse to the above is performed to thereby move the lens into the variable power area or the macroarea in the operation reverse to that mentioned above.

Figure 6:
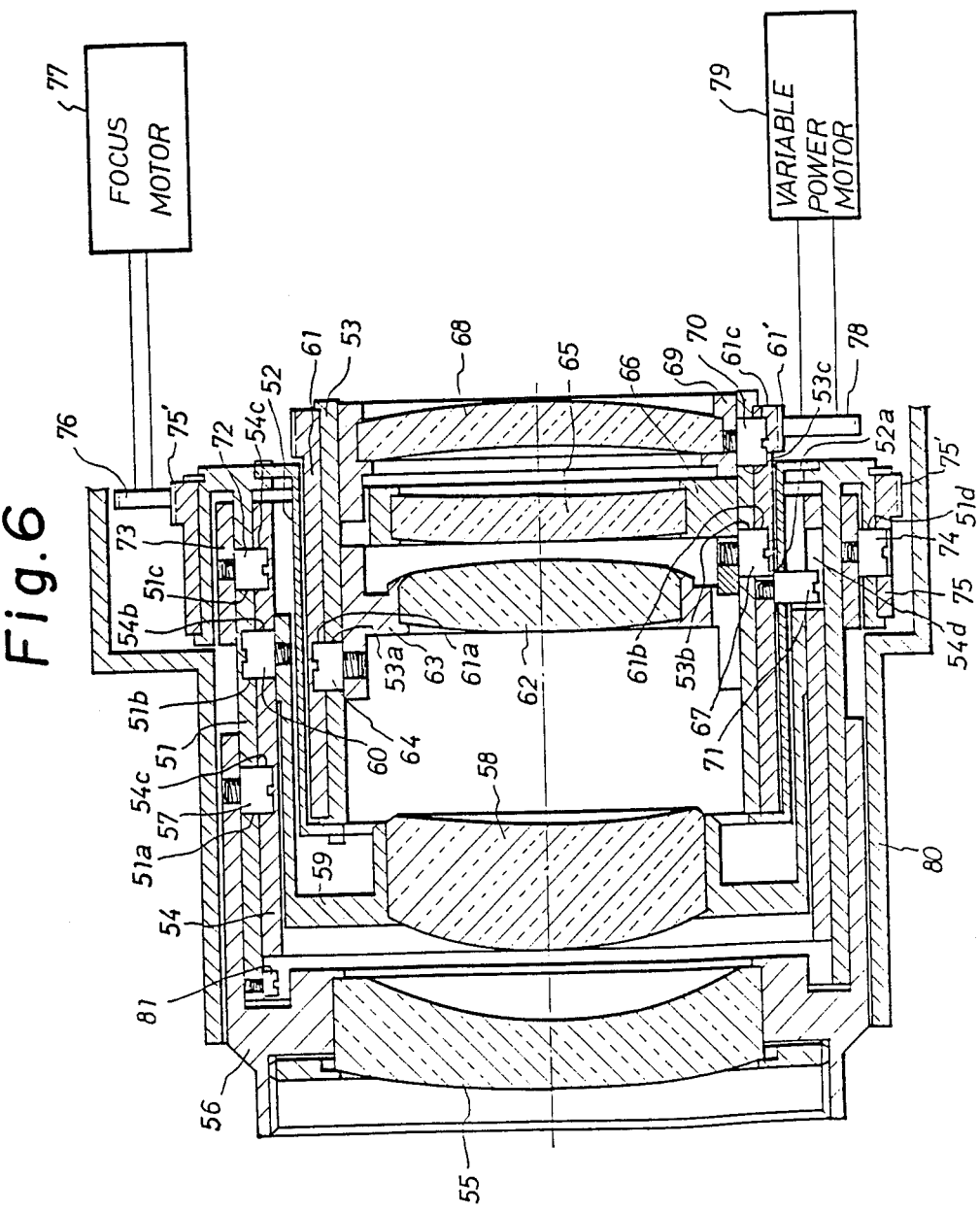
FIG. 6 is a schematic cross-section view showing the structure of another embodiment of a variable focus lens barrel according to this invention.

FIG. 6 is a schematic cross-section view showing the structure of another embodiment of a variable focus lens barrel according to this invention.

This embodiment is a camera in which a variable focusing lens barrel of the type in which a lens is driven electrically between the shorter and longer focal distances is fixed to the camera body, a so-called multifocus compact camera, to which this invention is applied. This embodiment shows a photographing lens unit composed of a so-called front focus variable power lens, in which the variable power optical system is composed of five lens groups such that all the lens groups are moved complexly in the direction of the optical axis for variable power drive and the first and second group lenses alone are moved in the direction of the optical axis for focusing drive.

Figure 7:
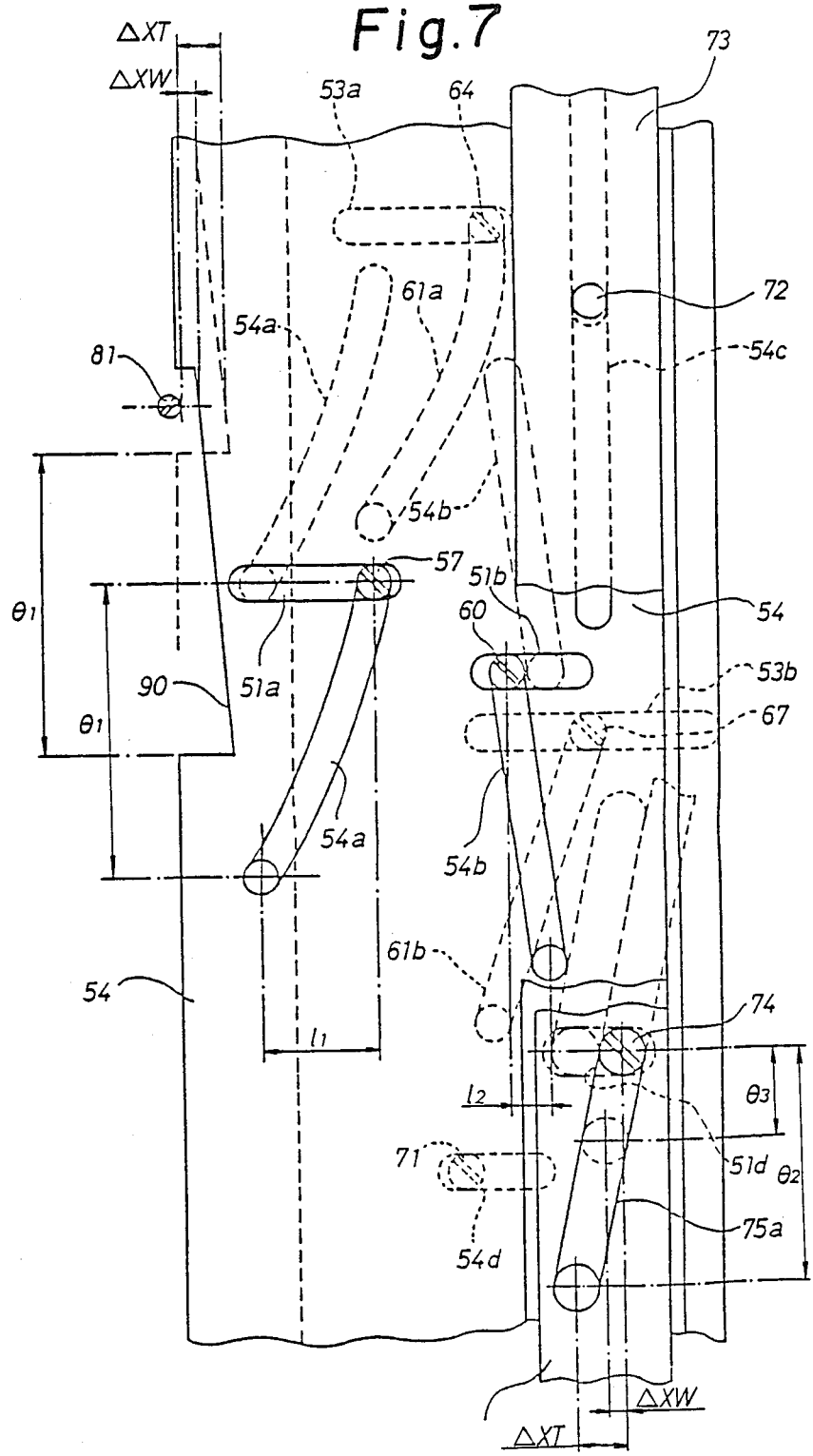
FIG. 7 is an exploded view of several cam members shown in FIG. 6.
Figure 8:
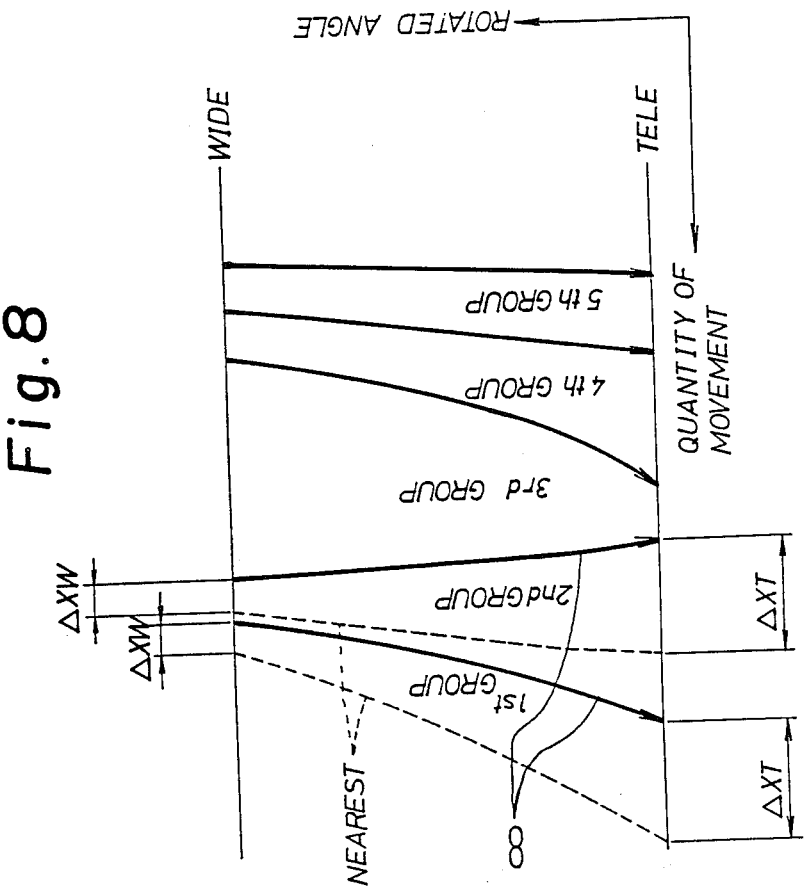
FIG. 8 is a schematic diagram showing the variable power and focusing movement of the respective lenses shown in FIG. 6.

In the examples of FIGS. 6–8, a cylindrical fixed lens barrel 51 is provided integrally with the camera body (not shown) and has a rear double-cylindrical portion, at the rear end of which a cylindrical connection member 52 is fixed at its rear end. Fixed to the front end of the connection member 52 is a fixed lens barrel 53 having a diameter smaller than the fixed lens barrel 51.

Provided within the fixed barrel 51 is a variable power drive frame 54 which is prevented from moving in the direction of the optical axis and supported slidable in the circumferential direction orthogonal to the optical axis.

A first movable frame 56 to which a first group lens 55 is fixed is supported around the outer periphery of the fixed barrel 51 such that it is slidable within a restricted range. A first inwardly protruding cam pin 57 is fixedly screwed into the first movable frame 56 and fitted slidably into the direct travel groove 51a formed in the fixed barrel 51 so as to be parallel to the optical axis, as shown in the view of an exploded cam in FIG. 7, and also fitted into the first cam groove 54a formed in the variable power drive frame 54 so as to intersect the optical axis.

Slidably provided within the drive frame 54 is a second movable frame 59 to which the second group lens 58 is fixed. A second outwardly protruding cam pin 60 is fixedly screwed into a periphery of the second frame 59. The second cam pin 60 is arranged to move in the direction of variable power drive by means of direct travel groove 51b and second cam groove 54b similar to the corresponding ones mentioned above.

Attached around the outer periphery of the fixed barrel 53 is a variable power drive frame 61 which is only allowed to rotate in a state in which the movement in the direction of the optical axis is prevented. The frame 61 has teeth 61' around its outer rear periphery. Slidably provided within the frame 61 is a third movable frame 63 to which a third group lens 62 is fixed. A third cam pin 64 is fixed to the periphery of the frame 63. The third cam pin 64 is arranged to move in the direction of variable power drive by means of a direct travel groove 53a formed in the fixed barrel 53 and a third cam groove 61a formed in the frame 61 in a manner similar to that mentioned above.

Slidably provided within the fixed barrel 53 is a fourth movable frame 66 to which a fourth group lens 65 is fixed. A fourth outwardly protruding cam pin 67 is fixed to the frame 66 and is arranged to move in the direction of variable power drive by means of a direct travel groove 53b formed in the fixed barrel 53 and a fourth cam groove 61b formed in the frame 61 in a manner similar to that mentioned above.

Slidably provided within the fixed barrel 53 is a fifth movable frame 69 to which a fifth group lens 68 is fixed. The frame 69 does not interfere with the fourth movable frame 66. The fifth frame 69 has a fifth outwardly protruding cam pin 70 fixed thereto which is engaged in the direct travel groove 53c so as not to interfere with the fourth cam pin 67 and also engaged in the fifth cam groove 61c formed in the variable power drive frame 61 so as to move in the direction of variable power drive. The fifth cam pin 70, direct travel groove 53c, and fifth cam groove 61c are not shown in FIG. 7.

The drive frame 61 has an outwardly protruding relay cam pin 71 fixed thereto. The pin 71 extends through an escape hole 52a provided in the surface of the link member 52 and is engaged at its end in a direct travel groove 61d formed in the variable power drive frame 54 so as to extend in the direction of the optical axis.

Provided around the outer surface of an inner cylinder of the double-cylindrical fixed barrel 51 is a direct travel frame 73 into which an inwardly protruding relay cam pin 72 is fixedly screwed. The pin 72 extends through escape hole 51c formed in the fixed barrel 51 and is engaged in cam groove 54c formed in the frame 54.

Fixed to the frame 73 is an outwardly protruding relay cam pin 74 which stops the rotation of the travel frame 73 by means of a direct travel groove 51d formed in the fixed barrel 51 and which is engaged in a focus cam groove 75a formed in the focus drive frame 75.

The focus drive frame 75 has a rear thicker portion, the outer periphery of which has gear teeth 75' which receive the torque from a cylindrical focus drive motor 77 via an output gear wheel 76.

Gear teeth 61' on the outer rear portion of the drive frame 61 receive the torque of a cylindrical variable power drive motor 79 via an output gear wheel 78.

As shown in FIG. 7, a near-distance stop cam surface 90 is formed at the front of the variable power drive frame 54 and is arrnged to abut on stop pin 81.

The inclination of the cam surface 90 restricts the near-distance position for the focus drive range in the focusing optical system including the first and second group lenses 55 and 58. In more detail, as shown in FIG. 8, the respective focus drive ranges on the telephoto and wide-angle sides for each of the first and second group lenses 55 and 58 are $\Delta_{XT}$ on the telephoto side and $\Delta_{XW}$ on the wide-angle side, so that the near-distance stop cam surface 90 is formed having such an inclination that the distance of the inclined cam surface has a distance covered until the cam surface 90 abuts the stop pin 81 corresponding to the respective nearest distances on the telephoto and wide-angle sides in variable power drive.

The variable focus lens barrel according to the embodiment constructed as mentioned above operates as follows.

Assume that focusing is performed under a condition in which the variable power drive frame 61 is rotated by the variable power drive motor 79 so as to provide a desired focal distance. When the focus drive motor 77 is rotated on the basis of the output from the automatic focusing sensing circuit (not shown) provided in the camera body, the torque is transmitted via output gear wheel 76 to the gear teeth 75' to thereby rotate the focus drive frame 75.

This causes the relay cam pin 74 which is prevented from rotating by the direct travel groove 51d to be driven in the direction of the optical action by the focus cam groove 75a (driven to the maximum $\Delta_{XT}$), so that the direct travel frame 73 moves in the direction of the optical axis. By this operation, the relay cam pin 72 moves in the direction of the optical axis in escape hole 51c provided in the fixed barrel 51, the variable power drive frame 54 is pressed by relay cam pin 72 inserted into the cam groove 54c in the frame 54, so that the first and second cam pins 57 and 60, which are prevented from rotating by the corresponding direct travel grooves 51a and 51b in the fixed barrel 51, are moved in the direction of the optical axis.

Therefore, the first and second movable frames 56 and 59, combined with the first and second cam pins 57 and 60, are moved in the direction of the optical axis, so that the first and second group lenses 55 and 58 are moved in the direction of the optical axis to perform a focus adjustment.

When the variable power drive frame 54 is moved in the direction of the optical action as the focus drive frame 75 rotates, the relay cam pin 71 is not driven because of the presence of the travel groove 54d even if the frame 54 is moved, so that the frame 61 is kept stationary. Therefore, the third, fourth and fifth cam pins 64, 67 and 70 are kept stationary and the third, fourth and fifth group lenses 62, 65 and 68 are also kept stationary.

On the other hand, a quantity of movement of the variable power drive frame 54 in the direction of the optical axis occurring in the focus driving varies depending on where the variable power drive frame 54 is in the angular range $\theta_1$ when the frame 54 rotates in accordance with the variable power drive, to be described in more detail later. Namely, as shown in FIG. 7, when the frame 54 is on the telephoto side, the movable distance $\Delta_{XT}$ between the near-distance stop cam surface 90 and stop pin 81 is large, and when the frame 54 is on the wide-angle side, the distance $\Delta_{XW}$ is smaller. The position of the drive frame 54 corresponding to distance infinity is the rightmost retracted position, as shown in FIG. 6. As the drive frame 54 is driven toward the near-distance side in accordance with the rotation of the focus drive motor 77, the drive frame 54 is moved forwardly.

At that time, the forward movement of the frame 54 is limited depending on where the near-distance stop cam surface 90 is relative to stop pin 81. Namely, when the frame 54 is rotated deepest in the telephoto side, it has a maximum stroke $\Delta_{XT}$ while when it is rotated deepest in the wide-angle side, it has a minimum stroke $\Delta_{XW}$.

Therefore, when the frame 54 is rotated to the wide-angle side, it is prevented from being driven to the near-distance side in which the optical performance is deteriorated.

When the variable power drive motor 79 is supplied in order to perform variable power drive, the variable power drive frame 61 is rotated via output gear wheel 78. This causes the third cam pin 64 engaged with the frame 61 to be moved in the direction of the optical axis by means of the third cam groove 61a under a condition in which the third cam pin 64 is prevented from rotating by the direct travel groove 53a in the fixed barrel 53. This causes the third movable frame 63 to move in the direction of the optical axis and the third group lens 62 moves in the direction of the optical axis.

At the same time, the fourth and fifth group lenses 65 and 68 are moved in the direction of the optical axis by means of the fourth and fifth cam grooves 61b and 61c in a state in which the fourth and fifth cam pins 67 and 70 are prevented from rotation by means of direct travel grooves 53b and 53c, respectively, as in the third cam pin 64.

The relay cam pin 71 rotates in the circumferential direction orthogonal to the optical axis in accordance with the rotation of the variable power drive frame 61. This causes pin 71 to push the travel groove 54d to thereby rotate frame 54. The first cam pin 57 is moved in the direction of the optical axis by means of first cam groove 54a in a state in which it is prevented from rotation by means of travel groove 51a in the fixed barrel 51. This causes the first movable frame 56 to move in the direction of the optical axis to thereby move the first group lens 55 in the dirction of the optical axis.

Simultaneously, similar to the first cam pin 57, the second cam pin 60 also is prevented from rotating by means of travel groove 51b and the second group lens 58 is moved in the direction of the optical axis by means of the second cam groove 54b.

At the time of variable power drive in which the first, the second, the third, fourth and fifth group lenses 55, 58, 62, 65 and 68 are moved in this way, the variable power drive frame 54 is rotated by the relay cam pin 71, but is prevented from moving in the direction of the optical axis by the relay cam pin 72 provided on the direct travel frame 73 in a stationary state and the cam groove 54c extended circumferentially orthogonal to the optical axis and receiving the cam pin 72, so that the first and second group lenses 55 and 58 do not move for focus adjustment.

However, there is a case in which the focus adjustment should be made even when the variable power drive motor 79 is being powered, namely, during the variable power drive. For example, when zooming is performed during photographing using a video camera in which the variable focus lens barrel according to this embodiment is built, the variable power drive of the first-fifth group lenses 55, 58, 62, 65 and 68 may be performed while the first and second group lenses 55 and 58 alone are moved additionally for focus adjustment by simultaneously powering the variable power drive and focus-drive motors 79 and 77.

To this end, if the response of a focusing sensing mechanism (not shown) is speeded up, zooming equivalent to that by a conventional zoom lens is performed.

In that case, assume that the near-distance stop cam surface 90 formed in the variable power drive frame 54 corresponding to the nearest distance on the telephoto side abuts on the stop pin 81. If the cam surface 90 is driven for variable power purposes toward the wide-angle side, the inclined surface of cam 90 pushes the stop pin 81, so that the frame 54 is moved compulsively in the direction of the optical axis. This compulsive movement is, however, performed in order to prevent the frame 54 from being moved into the deteriorated area of the optical performance corresponding to the focal distance during variable power driving, namely, into a distance shorter than the predetermined nearest distance. This increases the load on the drive motor 79 only slightly, so that there is no special problem occurring.

This applies not only when variable power driving and focus adjustment are performed simultaneously, but also when the lenses are driven to the wide-angle side by the variable power driving in a state in which the lenses are moved to the nearest position by the focus drive motor 77 during the telephoto photographing.

Therefore, in summary, during the focus adjustment by the variable power drive frame 54, if the lens is driven to a distance less than the nearest-distance corresponding to the focal distance during variable power drive, the near-distance stop cam 90 surface hits on the stop pin 81 to prevent the movement of the drive frame 54 to thereby increase greatly the load current flowing through the motor 79. Therefore, by sensing the increase in the current, the focus driving can be stopped.

This invention is not limited to the previous embodiments. For example, while the variable focus lens barrels in the embodiments have been described as being fixed to the camera body, it may be applicable to exchange lenses, of course.

The lens structure is not limited to the specified embodiments. For example, this invention may be applicable to focusing systems such as a front focusing system, an inner focusing system and a rear focusing system.

What is claimed is:

1. A variable focus lens barrel, comprising:
   a variable power drive frame having a plurality of cam grooves which each receive a cam pin provided on each of movable frames to which a lens group is each fixed;
   a motor to perform variable power drive on said variable power drive frame;
   a balanced groove formed at each of both ends of a variable power drive range of each of the cam grooves formed in the variable power drive frame such that the balanced groove extends circumferentially on the variable power drive frame over a predetermined angular range from each of said both ends; and wherein
   each of said movable frames does not move in the direction of the optical axis in a rotational area of the variable power drive frame in which each cam pin slides in the corresponding balanced groove.

2. A variable focus lens barrel according to claim 1, wherein:
   a balanced groove formed over a predetermined angular range connects one end of the variable power drive range of a cam groove formed in the variable power drive frame with one end of an accommodating range in which a frame is retracted.

3. A variable focus lens barrel according to claim 2, wherein:
   a balanced groove formed over a predetermined angular range connects the other end of the variable power drive range of a cam groove formed in the variable power drive frame with one end of a macrodrive range.

4. A variable focus lens barrel, comprising:
   a plurality of movable frames, to each one of which a lens group is fixed, which are slidably disposed in the direction of an optical axis relative to a fixed lens barrel;
   a plurality of variable power drive frames, arranged in a radially spaced relationship with one another, each having cam grooves with each groove receiving a corresponding cam pin provided on each of said movable frames which are rotatable relative to the fixed barrel;
   a variable power drive motor which rotates the variable power drive frames as a unit to perform variable power drive of the plurality of lens groups;
   a focusing drive motor which drives only a predetermined one of said plurality of variable power drive frames to drive only the lens group engaged in the predetermined variable power drive frame in the direction of the optical axis to thereby perform a focusing drive;
   said focusing drive characterized by a stop pin fixed to said fixed barrel and a near-distance stop cam provided on the predetermined variable power drive frame such that said stop cam abuts the stop pin at a position corresponding to the nearest-distance during variable power driving.

* * * * *